United States Patent [19]
Hackstein et al.

[11] 3,836,311
[45] Sept. 17, 1974

[54] APPARATUS FOR THE PRODUCTION OF PRESSED BLOCK FUEL ELEMENTS OF HIGH POWER FOR GAS COOLED HIGH TEMPERATURE REACTOR

[75] Inventors: Karl-Gerhard Hackstein, Hanau; Milan Hrovat, Rodenbach; Willi Wolff, Kahl, all of Germany

[73] Assignee: Nukem, G.m.b.H., Hanau, Germany

[22] Filed: Aug. 1, 1972

[21] Appl. No.: 277,103

[52] U.S. Cl. .................................. 425/406, 425/412
[51] Int. Cl. ............................................. B29c 3/02
[58] Field of Search ............ 425/78, 466, 412, 414, 425/352, 351, 355

[56] References Cited
UNITED STATES PATENTS

| | | | |
|---|---|---|---|
| 614,725 | 11/1898 | Jungbluth | 425/412 |
| 1,476,782 | 12/1923 | Wagner | 425/414 |
| 1,896,939 | 2/1933 | Calkins et al. | 425/354 X |
| 1,965,758 | 7/1934 | Armstrong | 425/352 |
| 2,037,269 | 4/1936 | Rieser | 425/354 X |
| 2,883,703 | 4/1959 | Frank | 425/354 X |
| 3,200,442 | 8/1965 | Haller | 425/354 X |
| 3,209,057 | 9/1965 | Lassman | 425/414 X |
| 3,210,450 | 10/1965 | Bratton | 425/414 X |
| 3,279,021 | 10/1966 | Pratt et al. | 425/414 X |

Primary Examiner—Robert L. Spicer, Jr.
Attorney, Agent, or Firm—Cushman, Darby & Cushman

[57] ABSTRACT

Molded or pressed block fuel elements of high power for gas cooled high temperatures are produced by molding in steel tools using outer dies or bars and punches arranged to be freely moveable in the axial direction and moving said moveable dies or bars and punches in the molding process.

6 Claims, 2 Drawing Figures

APPARATUS FOR THE PRODUCTION OF PRESSED BLOCK FUEL ELEMENTS OF HIGH POWER FOR GAS COOLED HIGH TEMPERATURE REACTOR

In German Offenlegungsschrift 1,902,994, Sept. 24, 1970 corresponding to Hrovat U.S. Pat. application Ser. No. 3284, filed Jan. 16, 1970, "Block Fuel Element For Gas Cooled High Temperature Power Reactor" and Hrovat U.S. application 218,244, filed Jan. 17, 1972 (corresponding to German application P 21 04 431.5) entitled "Process For The Production Of Block Fuel Elements For Gas Cooled High Temperature Power Reactor," there is described a monolithic block fuel element with pressed in cooling channels. The entire disclosures of said German applications, said U.S. Pat. application Ser. No. 3284 and said U.S. Pat. application Ser. No. 218,244 are hereby incorporated by reference.

The monolithic block fuel element is a compact prism consisting of a homogeneous graphite matrix and coated fuel particles. The coated particles are pressed into the graphite matrix in such a way that they form fuel zones around which the cooling channels are arranged.

In the production of such block fuel elements according to the generally known die pressing process difficulties occur which essentially consist in the fact that strong directional gradients occur above the height of the block and the cross section. Besides increased anisotropic gradients are produced in the graphite matrix which for their part also lead to unsatisfactory irradiation behavior.

These difficulties are essentially traced back to the large friction between the material to be pressed or molded and the inner bars which are necessary for the pressing in of the cooling channels and for the reception of the fuel and which fill more than 30 percent of the cross section.

The variable properties occurring thereby produce stresses in the reactor in the irradiation with high fast neutrons which can lead to the fracture of the element.

Furthermore it is very difficult and not easily reproducible to insert the particles together with the matrix material in the pressing tool in such a way that the coated fuel particles are fixed at positions provided during the pressing.

Of decisive importance is the good, transitionless union between the fuel zone and the fuel free graphite matrix. Because of the different expansion-shrinking behavior of the zones formed of the graphite matrix and fuel particles and of the remaining fuel free graphite matrix, there customarily occur hair flaws in the heat treatment. These flaws greatly reduce the thermal conductivity and the mechanically strength properties, of the matrix and thus considerably impair the fuel element behavior in the reactor core.

All of the above mentioned difficulties are overcome by the present invention by the fact that the outer die or mold and the inner bars and punches of the pressing tool are disposed to be freely moveable in the axial position and the fact that the parts are suspended during the pressing because of the friction with the material being pressed. An even compaction spread over the entire block will be achieved through axially moveable upper and lower punches with freely suspended inner bars therebetween. The gradients which occur in that case are negligible.

In order to obtain a definite fixation of the fuel zones during pressing, the pressing is preferably carried out in three steps. First the moldable graphite granulate is lightly premolded into a block without fuel and with slight pressure and at a temperature which is about the softening point of the binder resin in order to be able to handle the block. The cooling channels and the chnnels for the reception of fuel are pressed into this block. The coated fuel particles encased with graphite matrix are likewise lightly prepressed into small cylinders in the second step and are inserted in the channels provided for the reception of the fuel.

In the third step the metal rods (inner bars) are inserted in the channels provided for helium cooling gas and the block fuel element completely pressed at elevated temperature and full pressure.

According to the invention the inner bars for pressing in the cooling channels are connected to each other by a freely suspended plate and during pressing they can penetrate unhindered into the hollow space located below the pressing or molding die.

The molding powder can consist of graphite and binder resin. The binder resin employed, for example, can be phenol-formaldehyde with a softening point of about 100°C. but phenol-formaldehyde resins with other softening temperatures between 60° and 120°C. with or without addition of curing agents, such as hexamethylene tetramine, can be used. There also can be used xylenol or cresol-formaldehyde or furfuryl alcohol resins. The binder resin can be used in an amount of 10 to 30% of the graphite by weight.

As coated fuel particles there can be employed oxides or carbides of U 235, U 233 and fissionable plutonium isotropes as fuel materials in mixture with U 238 and/or Th 232 as fertile materials coated with multiple layers of pyrolytic carbon prepared in conventional manner.

The drawings illustrate the pressing principle.

Figure 1:
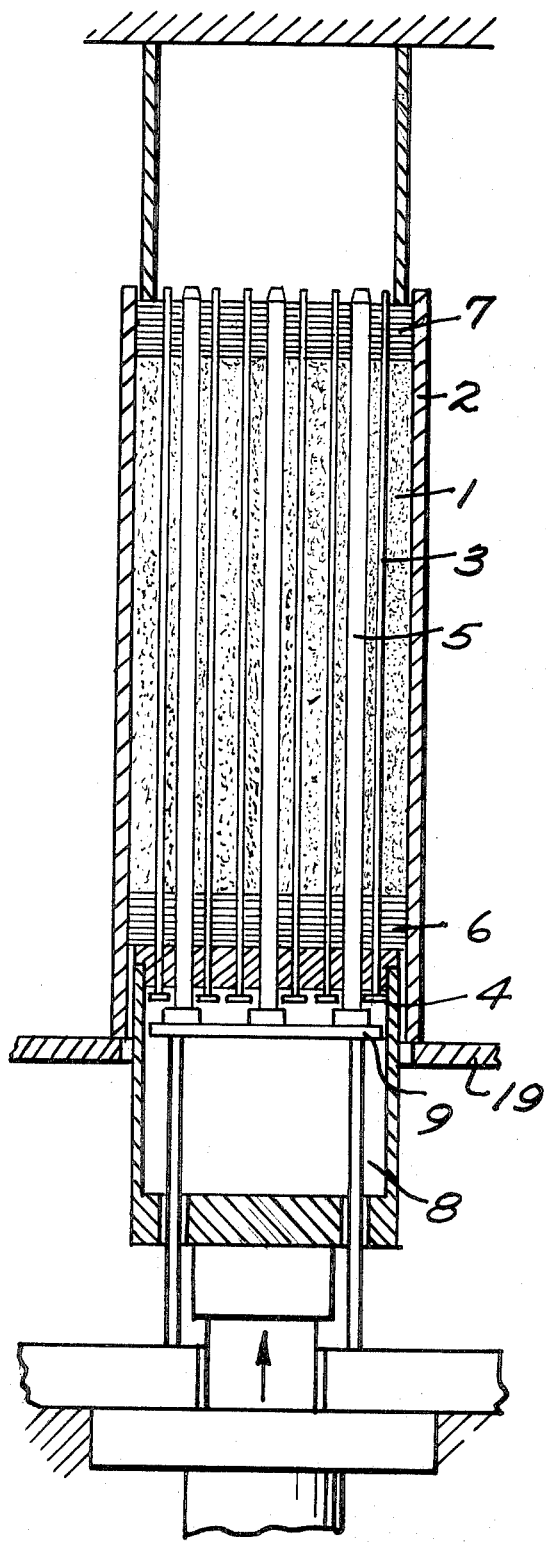
FIG. 1 shows the pressing tool arrangement after the filling.
Figure 2:
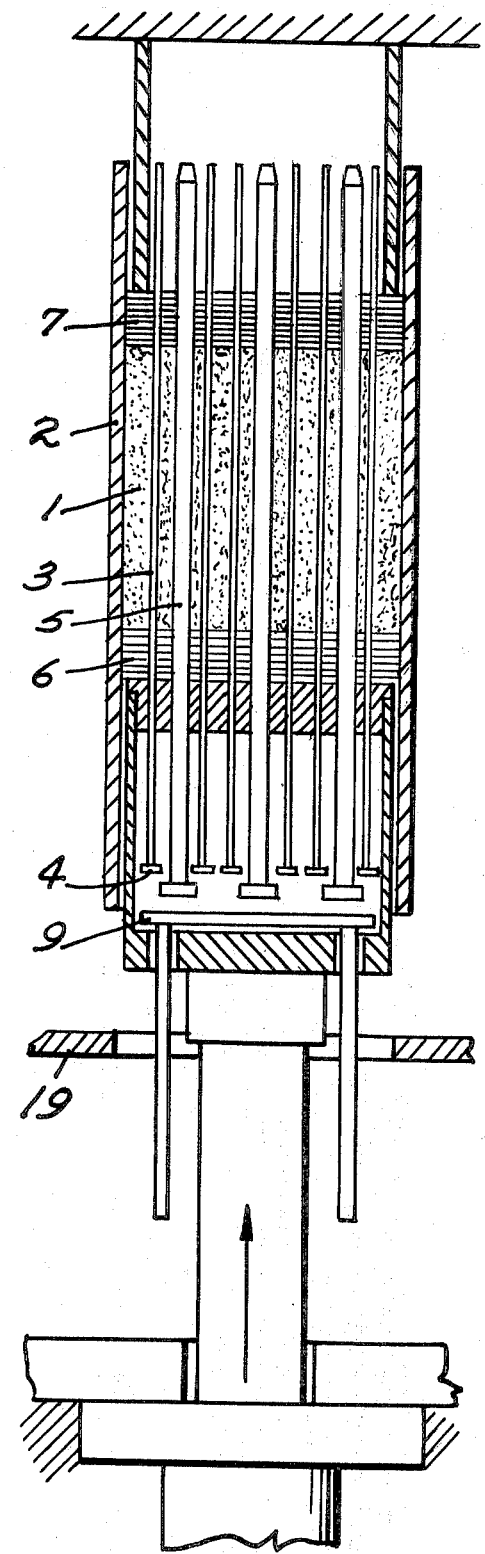
FIG. 2 shows the same pressing tool arrangement after the pressing.

The invention will be illustrated in more detail below in which there is described the function of the pressing tool in the production of monolithic block fuel elements.

Step 1 (Premolding)

After the moldable graphite granulate 1 (e.g. composed of 80 percent graphite and 20 percent phenol-formaldehyde resin having a softening point of 100 °C., molecular weight 700) is filled into the molding tool, the outer die 2 and the inner bars 3 and 5 rest unattached to supports 9 and 19. At the same time the inner bars are not connected with the outer die. The inner bars for cooling channel are bolted to the plate 4 while the bars for the fuel channels 5 are arranged loose. Compression occurs between the moveable lower molding punch 6 and the fixed upper punch 7. At the same time the outer die and the inner bars are lifted from the supports and are suspended. The outer die and the inner bars are held only by the frictional forces between the material being pressed and the pressing tool. The hollow space 8 having a diameter of 210 mm and length of 200 mm below the pressing die guarantees that the inner bars can move unhindered in the material to be pressed so that in every phase there is guaranteed a true two-sided compression.

The outer die for the premolding had an inner diameter of 240 mm (outer diameter 270 mm) and a height of 780 mm. The inner bars for the cooling channels measured 12.5 mm, the bars for the fuel channels and the central charging channel measured 26 mm in diameter with a length of 800 mm. The block into which are pressed 18 fuel channels, a central charging channel and 54 cooling channels, had diameter sizes corresponding to the tool and a height of 430 mm. Pressing was accomplished in the warm state at a pressure of less than 50 kg/cm$^2$. The temperature was adjusted to the softening point of the binder resin. The pressure can range from 20 to 50 kg/cm$^2$.

Step 2

For premolding of the fuel or inserts cylinders there were used spherical thorium-uranium oxide particles having a diameter of about 0.8 mm and multiple coated with pyrolytically deposited carbon. In a dragee process the coated fuel particles were overcoated with the molding powder of the same composition used for the granulate used in step 1. The thickness of the overcoating was 0.4 mm. the overcoated coated particles were hot precompressed into cylinders at a pressure of less than 50 kg/cm$^2$. The temperature was 80 °C. The pressure can vary from 10 to 50 kg/cm$^2$. The pressing tool pressed on both sides and operated completely automatically.

Step 3

The premolded fuel inserts were filled into the fuel channels of the prepressed block, 8 cylinders per channel, in all 18 × 8 or 144 pieces. As closures there were inserted in the channel ends prepressed plugs of graphite granulates having a height of 15 mm and a diameter of 25 mm. The laden block was inserted in an outer die having an inner diameter of 242 mm and a height of 780 mm. The inner bars for pressing the cooling channels had a diameter of 12,2 mm; for the central loading channel the measurement was 26.0 mm. After heating to the desired temperature, specifically 150 °C., the block fuel element was completely pressed at a pressure of less than 100 kg/cm$^2$ to the final dimension. (The pressure can vary between 50 and 100 kg/cm$^2$). Subsequently the block was ejected from the die and the inner bars removed.

The steel dies for both molding steps can be heated externally.

The upper and lower punches 6 and 7, directly in contact with material to be molded, can consist of an insulating material, e.g. hard tissue or plastic.

The block fuel elenent can be of various shpaes, e.g. as a hexagonal prism or as a cylinder.

What is claimed is:

1. A tool for the production of molded block fuel elements of high power for gas cooled high temperature reactors containing several axial cooling channels and axial cylindrical fuel channels, said tool comprising support means at one end of the tool, an outer hollow die extending axially of the tool and being freely movable in the axial direction, a plurality of inner bars extending axially of the tool, axially spaced molding punches defining between them a space within the outer die, the inner bars which are to form the cooling channels being joined together by a base plate at one end and being axially freely movable and are not engaged with said outer die or said punches.

2. A tool according to claim 1 wherein the inner bars which are used to form fuel channels are axially freely movable and are not engaged with any other part of the tool.

3. A tool according to claim 1 wherein there is provided a hollow space outside one of said molding punches, said hollow space being so proportioned that said inner bars can freely penetrate into said space during the molding.

4. A tool according to claim 1 wherein the parts of the molding punches being in direct contact with the molded material consist of an insulating material.

5. A tool for molded block fuel elements having parallel channels therethrough, said tool comprising a hollow outer die having a bore extending axially therethrough, two axially spaced apart molding punches engaging said bore and forming between them a molding space, each of said punches having a plurality of holes extending therethrough in a direction parallel to the axis of the bore, a plurality of bars arranged in said molding space, each bar extending loosely through a hole in each punch so as to be freely movable in an axial direction with respect to the punches whereby during movement of the punches into said molding space said bars can move in the material being pressed, and a freely movable base plate disposed outside said molding space, the ends of at least some of said bars being secured to said base plate.

6. A tool as in claim 5 wherein said outer die is disposed vertically and rests with its lower surface in engagement with a support, said tool further including means for moving the lower punch upwardly and means for maintaining the upper punch in a fixed position whereby said outer die may move upwardly during a molding operation.

* * * * *

UNITED STATES PATENT OFFICE
CERTIFICATE OF CORRECTION

Patent No. 3,836,311            Dated September 17, 1974

Inventor(s) Karl-Gerhard Hackstein; Milan Hrovat and Willi Wolff

It is certified that error appears in the above-identified patent and that said Letters Patent are hereby corrected as shown below:

In the heading:

Please add:

-- [30] Foreign Application Priority Data

February 3, 1972    Germany........P 22 05 018.6 --

Signed and sealed this 14th day of January 1975.

(SEAL)
Attest:

McCOY M. GIBSON JR.          C. MARSHALL DANN
Attesting Officer             Commissioner of Patents